United States Patent Office 3,326,944
Patented June 20, 1967

3,326,944
METHOD OF PRODUCING DEHYDROMUCIC ACID
Baak W. Lew, Wilmington, Del., assignor to Atlas Chemical Industries, Inc., Wilmington, Del., a corporation of Delaware
No Drawing. Filed Mar. 9, 1964, Ser. No. 350,522
13 Claims. (Cl. 260—347.3)

The present invention relates to the production of dehydromucic acid, DHMA (also known as 2,5 furandicarboxylic acid), and more particularly, to the catalytic oxidation of hydroxymethylfurfural (HMF) or hydroxymethyl furoic acid (HMFA) to produce DHMA.

In accord with the present invention, a starting material of HMF or HMFA is reacted with a strongly alkaline oxygenating liquor and catalytically oxidized to DHMA. The present invention also contemplates a process wherein a HMFA intermediate, useful as a source material for the production of a substantially color free DHMA, is produced by the catalytic oxidization of HMF carried out in the presence of a strongly alkaline oxygenating liquor.

In the process for the production of DHMA from HMF, the reaction is preferably carried out in the presence of a catalyst selected from the group consisting of: (1) platinum, and (2) platinum and a mixture of the oxides of silver and copper. Preferably the HMF component is incrementally added to the oxygenating liquor. The term "incrementally added" is meant to define a process wherein the component concerned is either gradually, but continuously, introduced into the reaction mixture over a period of time, or is added in small, but separate, portions over a period of time.

In the oxidation process for the production of DHMA from HMFA, the reaction is preferably carried out in the presence of a catalyst selected from the group consisting of platinum and palladium.

In the oxidation process for the production of DHMA from HMF, the intial oxidation of HMF to produce the HMFA intermediate is preferably carried out in the presence of a silver oxide-copper oxide catalyst.

Preferably the platinum and palladium catalysts recited in the foregoing description are supported. Suitable catalyst supports are, for example, diatomaceous earth, charcoal, and activated carbon. A catalyst support of activated carbon has been found to be eminently satisfactory in terms of handling, recovery and in process yields. Preferably at least one part of catalyst is used for each part by weight of starting material. However, lesser amounts of catalyst may be used if lengthened reaction times can be tolerated. As used herein, the term catalyst is intended to encompass both a single catalyst and mixtures of catalysts. Since the catalysts of the present process may be recovered and reused, the present process is adaptable to either batch or continuous operations.

A suitable method of placing a catalyst on a support is described by Mehltretter et al. in Jour. Amer. Chem. Soc., vol. 73, pp. 2424–27 (1951).

The oxygenating liquor into which the HMF or HMFA starting material is introduced is strongly alkaline and may comprise an aqueous solution of any strong base, for example, an alkali metal hydroxide such as potassium or sodium hydroxide. Suitably the reaction mixture contains an excess of the alkali metal hydroxide over the stoichiometric amount required to produce an alkali metal salt and maintain the reaction mixture at a pH of at least 12. The oxygenating liquors may efficiently contain a suitable process catalyst and molecular oxygen. A suitable source of molecular oxygen is oxygen gas bubbled through the alkaline solution. An alkaline solution of the formed alkali metal salt of DHMA may then be recovered from the reaction mixture by merely removing the catalyst by filtration. Suitably the recovery of the corresponding acid product, per se, may be made by acidification of the alkaline solution with a strong mineral acid such as hydrochloric acid, and recovery of the formed precipitate by filtration.

In carrying out the process of the present invention, it is desirable to avoid unduly high temperatures which would reduce the yield of HMFA by decomposition. The present invention therefore utilizes temperatures which are sufficiently high to carry out the reaction at a reasonable rate but are not high enough to cause decomposition of either the starting material or the DHMA product. Temperatures ranging between about 15° and about 45° C. are generally satisfactory for carrying out the present process. Temperatures between about 19° and 40° C. have been found to be eminently satisfactory.

The pressure at which the present process is carried out is not critical within a rather wide range, for example, while atmospheric pressures are generally suitable, pressures above and below atmospheric may be employed with almost equal suitability. Oxygen pressures above atmospheric are often useful to insure an oxygenating environment in the reaction vessel.

In producing DHMA from HMF via the HMFA intermediate, a substantially colorless product may be produced if the HMFA intermediate is purified before it is oxidized to DHMA. This may be accomplished by utilizing two separate oxidation steps. In the first step HMF is initially oxidized to HMFA with a silver oxide-copper oxide catalyst. The HMFA product is then separated from the silver oxide-copper oxide catalyst and if desired, purified by treatment with activated carbon. A pure HMFA product will generally result in a purified DHMA product. The purification step is particularly important in cases where the starting HMF material contains a large amount of impurities. The efficiency of the platinum or palladium catalyst utilized in oxidizing HMFA to DHMA may be reduced by impurities in the starting HMF material.

If the present process is carried out in two steps the HMFA product may be recovered by treating the product of the initial oxidizing step with concentrated hydrochloric acid in a weight ratio of about 1 to 1. The reaction product is then cooled and a crystalline HMFA product precipitates out and may be recovered by filtering. The crystals may then be washed with cold water until the wash water shows a negative chloride test. The crystals may then be dissolved in about ten times their weight of water and heated on a steam bath. The hot solution may then be filtered through a heated filter and the filtrate treated with activated carbon. The mixture may then be filtered while hot to remove the carbon and the filtrate allowed to cool. A snow-white crystalline product forms and may be separated by filtering. The product is useful as a feed material in oxidization processes such as those described in Examples 5 and 6 below.

The following examples are illustrative of the process of the present invention and are intended to exemplify rather than limit or define the invention.

EXAMPLE 1

Preparation of supported platinum catalyst 87 grams of activated carbon were digested overnight with 1:1 HCl. The carbon was then washed with distilled water and filtered to remove all traces of free acid. After the carbon had been dried for several hours at 100° C., it was added to a solution of 35 g. of chloroplatinic acid in 600 cc. of water. The mixture was stirred and then neutralized with sodium bicarbonate. The essentially neutral mixture was heated to 80° C. and 55 cc. of 38% formaldehyde was added gradually over a 45 minute period. Simultaneously with the addition of the formaldehyde, enough sodium bicarbonate was added to neutralize the formic acid being formed and to keep the mixture slightly alkaline. After the last of the formaldehyde had been added, the mixture was held at 80° C. for two hours with constant stirring. The platinized carbon liquor was then cooled to room temperature and washed successively with hot solutions of KCl of decreasing concentration and then given final washings with hot water until the water was free of chloride. The platinized activated carbon, when air-dried, contained 13% platinum, by weight.

Catalysts made in a similar manner and suitable for the purposes of the invention may contain as little as 3% platinum and as much as 15% platinum. Generally good results are obtained when a catalyst containing from about 5 to about 13% platinum by weight is utilized.

EXAMPLE 2

*Preparation of silver oxide-copper oxide catalyst*

400 grams of $CuSO_4 \cdot 5H_2O$ were dissolved in two liters of 70° C. water while the temperature of the solution was maintained at about 70° C. a solution of 80 g. of silver nitrate in 500 cc. of water was quickly added and the mixture stirred. A hot solution of 200 g. of NaOH in 500 cc. of water was then slowly added, with constant stirring, to the solution of copper sulfate and silver nitrate. The mixture was then stirred for half an hour, cooled to room temperature, and filtered. The filter cake (i.e. catalyst) was washed with water until the wash water was neutral. Thereafter it was weighed and used in the moist condition. The above preparation yielded 337 grams of moist catalyst.

EXAMPLE 3

*HMF to DHMA (platinum catalyst)*

One gram of HMF, having a purity of 98.2%, as dissolved in 5 grams of water. Separately an aqueous solution of NaOH was prepared by dissolving 1 gram of NaOH in 10 cc. of water (i.e., a 9.1 wt. percent NaOH solution). The solution of NaOH was subjected to continuous stirring and oxygenated by bubbling oxygen through it. To the stirred and oxygenated aqueous caustic solution was added one gram of the catalyst prepared in Example 1. Thereafter, while the temperature of the caustic solution was maintained at 24° C., all the HMF solution was added, dropwise, over a 30 minute period. The reaction was allowed to proceed until a total of 4¼ hours had elapsed. The catalyst was filtered off and the yellow oxidation liquor, when analyzed on a Beckman DK-2 spectorphotometer, was found to contain 95.2% of theoretical DHMA in the form of a DHMA salt. The acid may be recovered as a precipitate by acidification with a strong mineral acid such as, hydrochloric acid.

EXAMPLE 4

*HMF to DHMA (platinum, silver oxide and copper oxide catalysts)*

One gram of HMF, having a purity of 98.2%, was dissolved in 4 grams of water. Separately, 0.5 gram of NaOH was dissolved in 10 cc. of water to form an aqueous alkaline solution. The later solution was continuously stirred and oxygenated by bubbling oxygen through it. To this agitated, oxygenated solution, which was maintained at a temperature of 24° C., were added 1 gram of the catalyst of Example 1 and 1 gram of the catalyst of Example 2. Thereafter, all of the HMF solution was added, over a period of 30 minutes, and immediately thereafter another 0.5 gram of NaOH was added. The reaction was allowed to continue for a total period of 5 hours, at the end of which time oxidation to a DHMA salt was determined to be 99% of theory. The acid may be recovered from the colorless oxidation liquor as in Example 3.

EXAMPLE 5

*HMFA to DHMA (platinum catalyst)*

54.7 grams of HMFA were added to 89.6 grams of an aqueous solution of NaOH containing 40% by weight of NaOH and 87.6 grams of platinum supported on activated carbon catalyst containing 10% by weight of platinum. The catalyst was prepared as described in Example 1 above. The reaction mixture was then placed in an autoclave and the mixture oxygenated by bubbling oxygen therethrough. A temperature of between 40 and 42° C. was maintained over a reaction period of 20 minutes. A positive oxygen pressure of between 150 and 200 p.s.i.g. was maintained through the reaction period. After the reaction period, the oxygen pressure was reduced to atmospheric and the reaction product removed from the autoclave. The catalyst was filtered out and a product very slightly lemon in color was recovered. The recovered product, a DHMA salt, was analyzed by means of a spectrophotometer and found to contain a 98.9% of the theoretical yield of DHMA. The acid may be recovered from the recovered product by acidification with a mineral acid as in Example 3 above.

EXAMPLE 6

*HMFA to DHMA (palladium catalyst)*

71 grams of HMFA were added to a reaction mixture consisting of 112.5 grams of an aqueous mixture of NaOH containing 40% NaOH and 10.7 grams of a palladium catalyst supported on activated carbon containing 10% by weight of palladium. The resultant mixture was placed in an autoclave and was oxygenated by bubbling oxygen therethrough with constant stirring. A reaction temperature of 40° C. was maintained for a period of 60 minutes. A positive pressure of from 65 to 85 p.s.i.g. was maintained during the reaction period. The reaction pressure was then reduced and the reaction product removed from the autoclave. The catalyst was filtered out and the filtrate, a very light lemon color was analyzed by a spectrophotometer and found to contain 95.6% of the theoretical yield of DHMA in the form of a DHMA salt. The acid product may be recovered by acidification with a mineral acid as in Example 3 above.

EXAMPLE 7

*HMF to HMFA (silver oxide-copper oxide catalyst)*

60 grams of NaOH were dissolved in 600 cc. of water. The solution was placed in a flask equipped with a stirrer, a thermometer, and two oxygen inlets. The stirrer was placed in operation and oxygen passed in the flask. 150 g. of silver-oxide copper-oxide catalyst were then added to the flask. An ice water bath was utilized to lower the temperature of the stirred NaOH solution to about 20° C. 141.3 grams of HMF were dissolved in 150 cc. of water and the HMF solution added to the flask contents from a point below the liquid surface at a rate of about 8 or 9 cc. per minute. The temperature during this time was maintained at 19–20° C. by means of an ice bath. The temperature was allowed to rise over a 45 minute period with continued oxygenation and stirring. The mixture was then filtered and the filtered catalyst was then washed with 250 cc.of water. The filtrates were combined and analyzed for HMFA by U.V. absorption. The filtrate product was found to contain 96% of theoretical yield of HMFA.

The filtrate product was then mixed with 130 cc. of concentrated hydrochloric acid to precipitate the HMFA. The acid mixture was left in a 1° C. cold room for 3 hours to complete the precipitation. The crystalline product was filtered and washed with ice-cold water until the wash water showed a negative chloride test.

The HMFA product was a tan colored crystalline material.

124.5 grams of a HMFA product recovered by the procedure described above was further purified by dissolving the HMFA product in 1250 cc. of heated water. The hot solution containing some gummy material was then filtered through a heated filter. The filtrate was treated with 23 grams of activated carbon, heated and stirred for a period of about 15 minutes. The solution was then filtered through a heated funnel. The filtrate was allowed to cool and the resultant crystalline product was filtered, washed with ice-cold water, and dried at 45–50° C. in a vacuum oven. The HMFA product was a snow-white crystalline material melting at 166–167° C. The HMFA product was indicated to be 99.6% pure by titration to phenolphthalein end-point and 97.7% pure by pH titration.

The HMFA product produced by the foregoing process was particularly suited to use in a further oxidation step to produce a relatively pure DHMA product. In the process of the present invention, the purified HMFA product of this example is particularly suited to use as a starting material in the HMFA to DHMA oxidation processes described in Examples 5 and 6.

While it is preferred to use relatively pure HMF as an initial reactant, impure materials may also be used. Such impure reactants require relatively more catalyst than does pure HMF or, alternatively, longer reaction times and may yield a DHMA having traces of color. The separate steps of initially oxidizing the HMF to HMFA and purifying and then oxidizing a purified HMFA to DHMA may be found useful in cases involving relatively impure HMF starting material. Frequently, color traces may be removed by treatment of the acid-containing oxygenating liquor with activated carbon or alkaline permanganate.

Recovery of DHMA, after removal of the catalyst from the oxygenating liquor, may be effected by acidification of the filtrate with a strong mineral acid, such as, for example, HCl. Upon acidification of the filtrate, DHMA precipitates quantitatively.

What is claimed is:

1. A process for preparing a solution of an alkali metal salt of 2,5 furandicarboxylic acid which comprises the steps of
    reacting a solution of a member of the group consisting of hydroxymethyl furoic acid and hydroxymethylfurfural
    with gaseous oxygen
    in the presence of platinum metal as catalyst and
    in an excess of an alkali metal hydroxide over the stoichiometric amount required to produce an alkali metal salt and maintain the reaction mixture at a pH of at least 12.

2. The process described in claim 1 wherein the starting material is hydroxymethyl furoic acid.

3. The process described in claim 1 wherein the starting material is hydroxymethylfurfural.

4. The process of claim 3 wherein the hydroxymethylfurfural is incrementally added to the reaction mixture.

5. A process for preparing a solution of an alkali metal salt of 2,5 furandicarboxylic acid which comprises the steps of
    reacting a solution of hydroxymethyl furoic acid with gaseous oxygen
    in the presence of a catalyst selected from the group consisting of platinum metal and palladium metal, and
    in an excess of an alkali metal hydroxide over the stoichiometric amount required to produce an alkali metal salt and maintain the reaction mixture at a pH of at least 12.

6. The process of claim 5 wherein the catalyst is palladium metal.

7. A process for preparing a solution of an alkali metal salt of 2,5 furandicarboxylic acid which comprises the steps of
    reacting a solution of a member of the group consisting of hydroxymethyl furoic acid and hydroxymethylfurfural
    with gaseous oxygen
    in the presence of a catalyst consisting of platinum metal and oxides of copper and silver, and
    in an excess of an alkali metal hydroxide over the stoichiometric amount required to produce an alkali metal salt and maintain the reaction mixture at a pH of at least 12.

8. The process of claim 7 wherein the starting material is hydroxymethyl furoic acid.

9. The process of claim 7 wherein the starting material is hydroxymethylfurfural.

10. The process of claim 9 wherein the hydroxymethylfurfural is incrementally added to the reaction mixture.

11. A process for preparing a solution of an alkali metal salt of 2,5 furandicarboxylic acid which comprises the steps of
    first reacting a solution of hydroxymethylfurfural
    with gaseous oxygen
    in the presence of a copper oxide-silver-oxide catalyst
    and in the presence of a stoichiometric excess of an alkali metal hydroxide over that required to produce the alkali metal salt, and maintain a pH of at least 12,
    to produce a hydroxymethyl furoic acid salt product
    forming a reaction mixture of said salt product
    with gaseous oxygen
    in the presence of a catalyst selected from the group consisting of platinum metal and palladium metal, and
    in a stoichiometric excess of an alkali metal hydroxide over that required to produce the alkali metal salt, and maintain a pH of at least 12.

12. The process of claim 11 wherein
    the catalyst used in the oxidation of the hydroxymethyl furoic acid salt product is platinum metal.

13. The process of claim 11 wherein
    the catalyst used in the oxidation of the hydroxymethyl furoic acid salt product is palladium metal.

References Cited

UNITED STATES PATENTS 2,407,066  9/1946  Dunlop _____ 260—347.3

OTHER REFERENCES

Lucas: Organic Chemistry, 2nd ed., 1953, American Book Co., New York, N.Y., pp. 146–8 and 173–4.

Mehltretter et al.: J.A.C.S., vol. 73, 1951, pp. 2424–2426.

ALEX MAZEL, *Primary Examiner.*

HENRY R. JILES, *Examiner.*

JAMES H. TURNIPSEED, *Assistant Examiner.*